March 17, 1931.    C. V. BUDDENBROCK    1,796,588
APPARATUS FOR TREATING SOIL
Filed Dec. 31, 1928    2 Sheets-Sheet 1
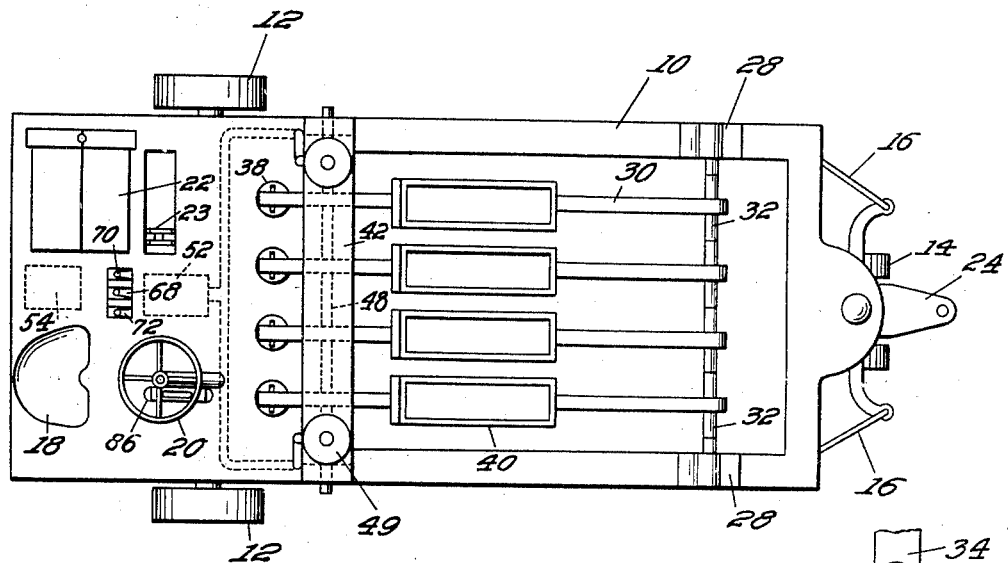
FIG. 1
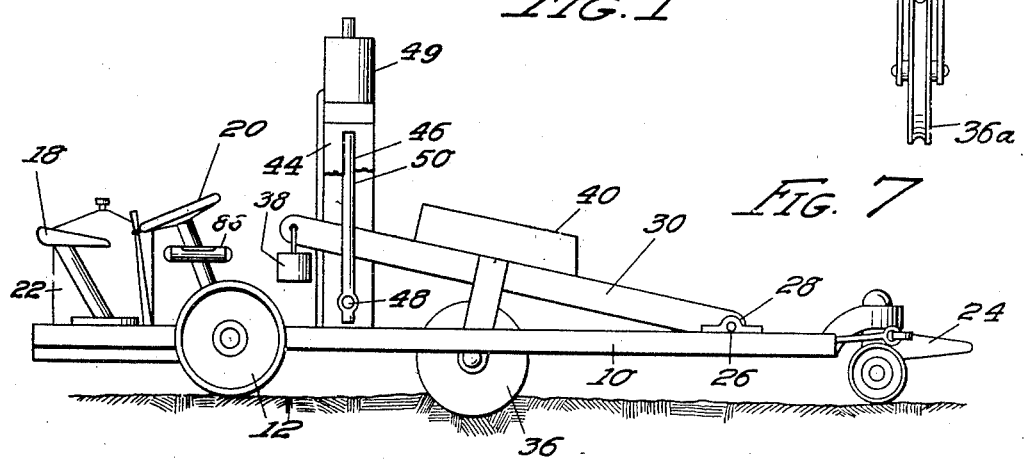
FIG. 7
FIG. 2
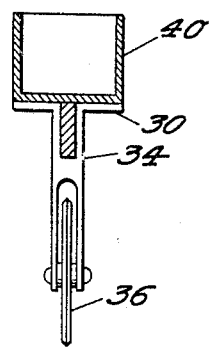
FIG. 3
CHARLES V. BUDDENBROCK
INVENTOR
PER Albert J. Fihe
ATTORNEY March 17, 1931. C. V. BUDDENBROCK 1,796,588
APPARATUS FOR TREATING SOIL
Filed Dec. 31, 1928 2 Sheets-Sheet 2

CHARLES V. BUDDENBROCK
INVENTOR

PER Albert J. Fihe
ATTORNEY

Patented Mar. 17, 1931

1,796,588

UNITED STATES PATENT OFFICE

CHARLES V. BUDDENBROCK, OF TRINIDAD, COLORADO

APPARATUS FOR TREATING SOIL

Application filed December 31, 1928. Serial No. 329,358.

This invention relates to improvements in a method and apparatus for treating soil and has for one of its principal objects the provision of means for cutting a series of furrows in soil to permit the ready absorption and retention of moisture therein.

In farming rolling land, particularly where the soil is hard, considerable difficulty is encountered in keeping the high portions of the same moist and in keeping the low portions from becoming swampy. When rain falls a small portion of the moisture soaks into the ground on the higher portions of the land, but a greater portion of the rain runs down the sides of the slopes and collects in the valleys, thereby providing the low portions of the field with an over abundance of water and not providing the hill tops and slopes with sufficient water. Applicant's device tends to eliminate this undesirable condition, inasmuch as one of the important objects thereof is to provide a device which will cut furrows in the tops and slopes of the hills, the said furrows being cut at right-angles to the slope of the same, thereby providing a series of small reservoirs down the entire side of the slope. This obviously retards the flow of water down the hillside and gives the rain water more time to seep into the lower soil of the slopes on its way down.

Another important object of the invention is the provision of means for eliminating the undesirable formation of arroyos, due to the rapid flow of the water down the slope of the hills and the attendant erosion which necessarily follows. The said means comprise the formation of these above mentioned furrows cut at right angles to the natural flow of the water.

A further important object of this invention is to provide means in connection with ditch or canal irrigated land for uniformly distributing the acquired water from the ditches or the like upon all parts of the surface of the land to be watered.

Other and further important objects of the invention will be apparent from the disclosures in the accompanying drawings and following specification.

The invention, in a preferred form, is illustrated in the drawings, and hereinafter more fully described.

In the drawings:

Figure 1 is a top plan view of the completely assembled soil treating device.

Figure 2 is a side elevation of the device as shown in Figure 1.

Figure 3 is a detail view, illustrating one of the cutting wheels.

Figure 7 shows an attachment for the machine whereby the furrows can be later closed, if desired.

As shown in the drawings:

Figure 5:
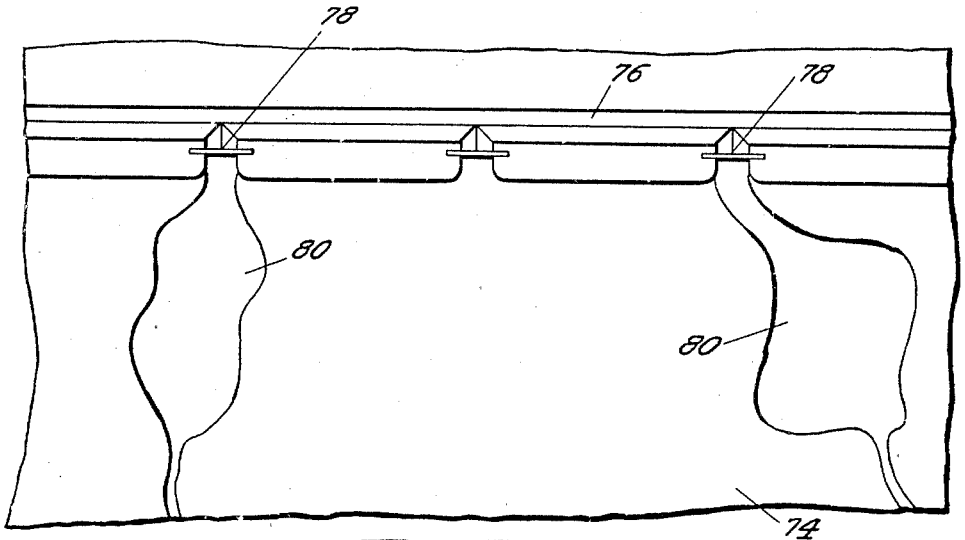
Figure 5 is a plan view of an irrigated field before using the soil treating device.

The reference numeral 10 indicates generally a vehicle frame, chassis or the like, supported at one end by a pair of driving wheels 12. The other end of the chassis is supported by a pair of wheels 14 which are adapted to be steered by means of cables 16 from a driver's seat 18 mounted on the rear of the chassis.

The cables are operatively associated with a steering wheel 20 positioned immediately in front of the seat 18.

The vehicle is preferably driven by means of an engine 22 mounted upon the rear of the chassis 10 and operatively associated with the wheels 12 by means of a sprocket and chain or the like 23, or if desired can be pulled by horses which can be hitched to a tongue 24.

A bearing rod 26 is transversely positioned upon the chassis 10, the same being rigidly mounted in suitable housings 28 positioned on each outer longitudinal frame member of the said chassis.

Figure 6:
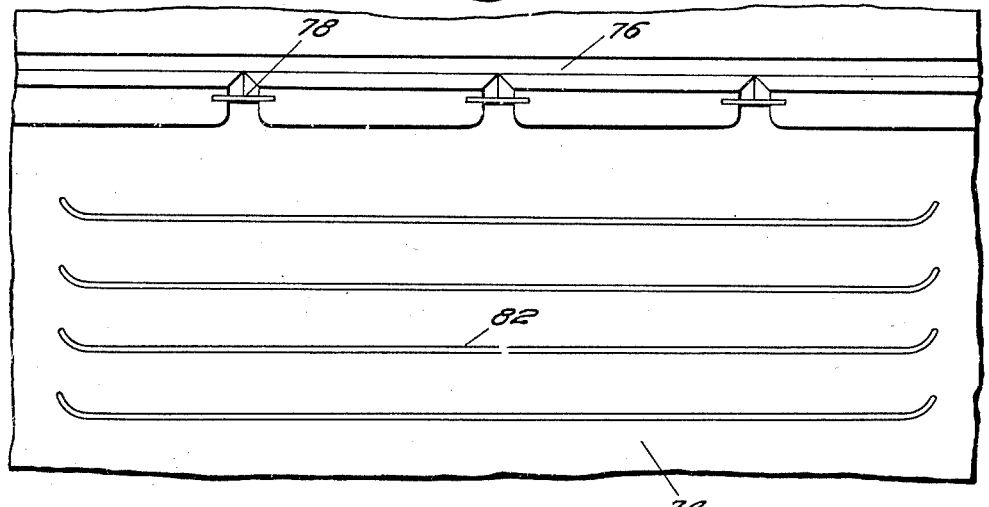
Figure 6 is a plan view of the same field as shown in Figure 5 after the field has been treated in accordance with this invention.

Pivotally mounted upon the bearing rod 26 is a series of lever bars 30, the pivotal mounting comprising a plurality of sleeves 32 positioned end to end along the length of the rod 26. Rigidly attached to the longitudinal center of each of the sleeves is one end of each of the lever bars 30. Rigidly mounted upon substantially the longitudinal center of each of the bars 30 and extending downwardly therefrom is a fork 34, and rotatably positioned at the lower end of each of the forks is a soil cutting wheel 36. These wheels are adapted to roll upon and cut a series of furrows in the surface of the soil as best shown in Figures 2 and 6.

Depending upon the consistency and moisture content of the soil, variable downward forces will have to be applied to the wheels 36 in order to cut furrows of desirable depths. Hence weights 38 are hung from the outer end of each of the bars 30 and are of such a character and design that they may be changed as desired. Further means for variably weighting the wheels 36 comprises an open box or container 40 which is rigidly mounted upon each of the bars 30 immediately above each cutting wheel. When additional weighting is necessary these boxes can be filled with scrap iron, rocks or whatever material happens to be available.

As desired, the weights 38 may be made constant and the boxes used to vary the weight or vice versa, or both may be varied.

A super-structure 42 is mounted upon the chassis 10 adjacent the free ends of the bars 30, each of the side members 44 of the said structure being provided with a slot 46 in which the ends of a transverse bar 48, shown best in Figure 1, are slidably positioned. A pair of hydraulic hoist cylinders 49 is mounted upon the top of the structure 42, one being positioned adjacent each end of the structure. Extending downwardly from each of the said cylinders is a plunger rod 50 shown in Figure 2. The lower end of each of the plunger rods is rigidly connected to the rod 48 which is adapted to be lifted thereby, which in turn lifts the free ends of the bars 30 and the wheels 36.

Mounted upon the rear end of the chassis 10 is a hydraulic pump 52, as shown by the dotted lines in Figure 1 adapted to be operated by the engine 22. A reservoir 54 containing the fluid supply for the hydraulic hoist is also mounted upon the rear end of the vehicle. Air pressure may be used if desired.

Figure 4:
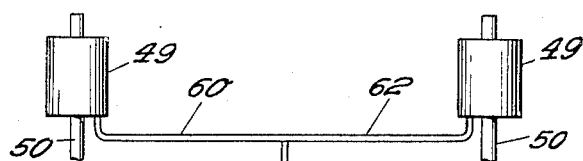
Figure 4 is a schematic view of the piping connections of the hydraulic hoist.

A schematic or diagrammatic view of the piping connections for the hoist is shown in Figure 4, the operation of the same being as follows: A pipe 56 containing a one-way flow valve connects the reservoir 54 to the low pressure side of the pump 52. The high pressure side of the pump is connected to each of the cylinders 49 by means of pipes 58, 60 and 62. A connection is made between the reservoir 54 and the high pressure pipe 58 and comprises a pipe 64 wherein a combination valve and pump control 66 is inserted. This control 66 is operated manually by means of a lever or the like 68, shown in Figure 1.

In raising the plungers 50, the lever 68 is thrown to its operating position whereby the pump 52 is connected with the motor 22 and at the same time the valve 66 in the pipe 64 is closed. Hydraulic pressure is then set up within the cylinders 49 and the plungers raise. To lower the plunger 50 the lever 68 is thrown to its release position which stops the pump 52 and opens the valve 66 allowing the fluid to return to the reservoir 54. In order to hold the plungers 50 in their raised position the lever 70, shown in Figure 1, is adapted to disconnect the pump 52 from the engine 22 but does not open the valve 66, thereby maintaining a constant pressure in the cylinders.

A combination clutch and reversing lever 72 is mounted upon the rear of the chassis 10 and is adapted to operatively connect the engine 22 and the driving wheels 12.

A further feature of the invention is shown in Figure 7 and comprises grooved wheels 36a adapted to be mounted in the forks 34 in lieu of the wheels 36. The purpose of the said wheels is to close, with a thin layer of soil, the furrows made by the wheels 36. The field is first furrowed by means of the wheels 36, and in the period between the close of the rainy season and before plowing time has arrived the water would tend to evaporate quickly from the open furrows. To remedy this situation, the field is again worked as soon as the rainy season is over, using the wheels 36a in place of the wheels 36, the grooved character of the said wheels being adapted to seal the openings of the furrows and protect the water therein contained from evaporation. These furrows may be sealed by other means than that described above as by the use of angularly disposed scrapers, rollers, or any other suitable means.

Figure 5 is a plan view of an irregularly surfaced field 74, the same being irrigated by a ditch or the like 76. Spaced at intervals along the length of the ditch is a series of sluice gates 78, the said gates adapted to be manually operated and when opened permit water to flow from the ditch to the field 74. Naturally the water will seek the low portions of the field and form pools 80. It is obvious that this is an undesirable situation inasmuch as the high portions of the field are left dry and unaffected by the irrigation water.

Figure 6 is a plan view of the same field as shown in Figure 5, after the furrowing process has been performed leaving cuts 82 therein, the said cuts being shown exaggerated as to size and spacing. These cuts form a series of small canals which water the entire field uniformly inasmuch as the channels cut in the high portions of the ground are cut deeper than the cuts in the lower portions of the same, the lowest portion of all the cuts being substantially equilevel.

It is apparent that herein is provided a means and method for scientifically treating soil in areas of the country where heavy rainfalls are confined to a brief but intensely wet season; the remainder of the year being abnormally dry. The invention is simple of operation and construction and is extremely flexible and rugged, and can be manufactured economically.

In order to be properly aware of the evenness or unevenness of the ground over which the machine travels, a level 86 is mounted upon the steering shaft housing where it can be readily referred to by the operator.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. In a soil treating device, a chassis, including a set of supporting wheels, and a plurality of vertically positioned cutting members distinct from the wheels for furrowing the ground, said cutting members comprising a plurality of vertically rotatable cutting wheels, and means for varying the operating pressure on the said cutting wheels, said means including a plurality of weight retainers operatively associated with each cutting wheel, and means for raising all of the cutting wheels simultaneously, said means comprising a hydraulic hoist mechanism.

2. In a soil treating device, a chassis, a plurality of wheels upon which the chassis is mounted, a transverse bearing rod positioned on the chassis, a plurality of lever bars pivotally mounted upon the bearing rods, and a plurality of soil cutting members operatively associated with the lever bars, said cutting members comprising a plurality of vertically rotatable cutting wheels, and means for varying the operating pressure on the said cutting wheels, said means including a plurality of weight retainers operatively associated with each lever bar, and means for raising all of the cutting wheels simultaneously, said means comprising a hydraulic hoist mechanism.

3. In a soil treating device, a chassis, a plurality of wheels upon which the chassis is mounted, a transverse bearing rod positioned on the chassis, a plurality of lever bars pivotally mounted upon the bearing rods, and a plurality of soil cutting members operatively associated with the lever bars, said cutting members comprising a plurality of vertically rotatable cutting wheels, and means for varying the operating pressure on the said cutting wheels, said means including a plurality of weight retainers operatively associated with each lever bar, and means for raising all of the cutting wheels simultaneously, said means comprising a hydraulic hoist mechanism, said hydraulic hoist mechanism including a super-structure mounted upon the chassis, the sides of the said super-structure being provided with vertical slots, a pair of pressure cylinders mounted upon the top of the super-structure, a plunger rod extending downwardly from each of the cylinders, a transverse rod positioned in the slots of the side members, the lower ends of the plunger rods being rigidly connected to the transverse rod, the transverse rod being adapted to lift the lever bars when pressure is applied to the cylinders.

In testimony whereof I affix my signature.

CHARLES V. BUDDENBROCK.